(No Model.)

E. J. CORSER.
FERTILIZER DISTRIBUTER.

No. 374,453. Patented Dec. 6, 1887.

ON LINE X—X

Attest.
Sidney P. Hollingsworth
W. R. Kennedy.

Inventor.
E. Jay Corser
By Phil T. Dodge
Atty.

N. PETERS, Photo-Lithographer, Washington, D. C.

UNITED STATES PATENT OFFICE.

EDSON JAY CORSER, OF MACEDON, NEW YORK, ASSIGNOR TO GEORGE WILSON KIRKPATRICK, OF SAME PLACE.

FERTILIZER-DISTRIBUTER.

SPECIFICATION forming part of Letters Patent No. 374,453, dated December 6, 1887.

Application filed April 19, 1887. Serial No. 235,330. (No model.)

*To all whom it may concern:*

Be it known that I, EDSON JAY CORSER, of Macedon, in the county of Wayne and State of New York, have invented certain Improvements in Fertilizer-Distributers, of which the following is a specification.

The aim of my invention is to provide a distributer whereby phosphates and other fertilizers may be delivered with certainty and uniformity and the rate of delivery varied at the will of the attendant.

To this end it consists, essentially, of a rotary feed-wheel having delivery-arms whereby the material is delivered through a central tube or spout, which is made adjustable in height to vary the rate of feed.

Figure 1:
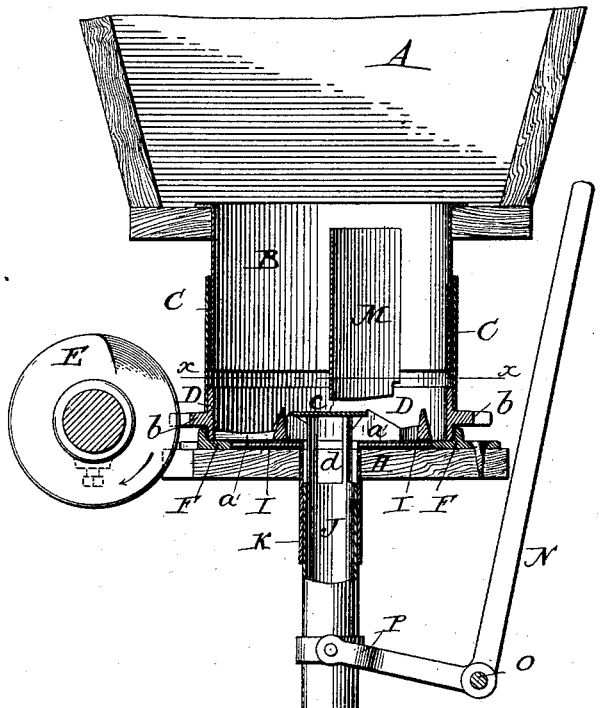
Figure 3:
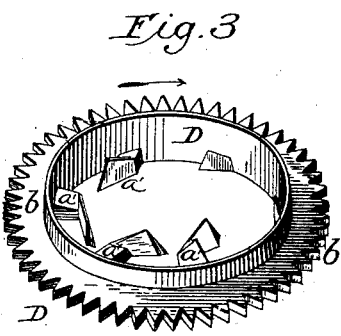
Figure 2:
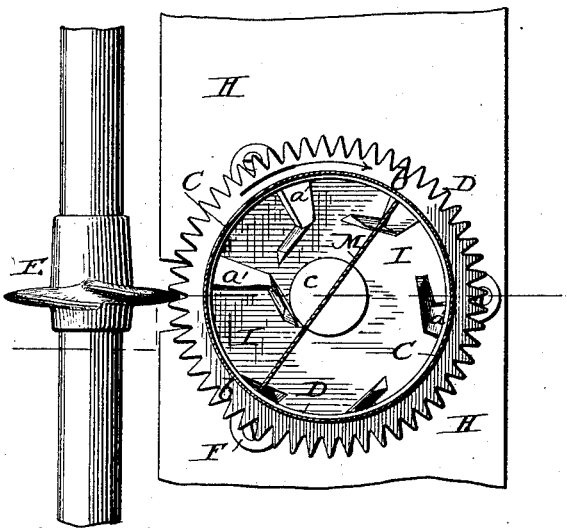
Figure 4:
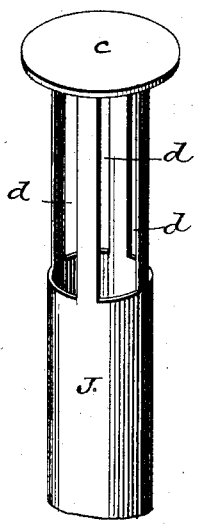

In the accompanying drawings, Figure 1 represents a transverse vertical section through a hopper having my distributer arranged thereunder. Fig. 2 is a horizontal section on the line $x$ $x$, looking in a downward direction. Fig. 3 is a perspective view of the feed-wheel proper. Fig. 4 is a perspective view of the delivering and feed-controlling tube.

Referring to the drawings, A represents an ordinary hopper provided in its bottom with a circular opening, and a circular flange or tube, B, fixed in position and projecting downward a suitable distance below the hopper, as shown. The lower end of this tube enters the lower end of a tube or sleeve, C, fixed to or formed upon a horizontally-rotating feed-wheel, D. This wheel, as shown in Fig. 3, is made in an annular form, with a series of arms, $a'$, extending inward from its walls toward the center. The successive arms are extended inward different distances, and at the inner ends have their faces inclined in such manner that as the wheel revolves in the direction indicated by the arrow the successive arms, acting upon the material, will force the same toward the center. On its periphery this wheel is provided with an annular toothed flange, $b$, designed to co-operate with a worm-wheel, E, or other equivalent device for imparting a constant rotary motion to the wheel. At its lower side the wheel D revolves upon or within a stationary supporting-plate, F, bolted to a portion, H, of the main frame or other suitable support. Within the plate F, which is of annular form, there is a metallic plate, I, preferably of zinc, seated removably in place and serving as a bottom to the feeder to support the mass of material as it passes to the delivery-opening. This plate may be formed in one piece or as a part of the plate F, if preferred.

The plate I is provided with a central discharge-opening, to which the material is delivered by the arms $a'$, before referred to. Through this discharge-opening there extends a central vertical adjustable delivery-tube, J. At its upper end this discharge-tube is provided with a cap or cover, $c$, and with lateral openings or slots $d$, through which the material passes in its outward course. These feed-openings are elongated in a vertical direction, so that by moving the tube J vertically the openings may be exposed above the plate I to a greater or less extent, and thus the delivery-throats increased or diminished to vary the rate of discharge without changing the speed at which the wheel D revolves.

For the purpose of steadying and supporting the tube J, I commonly pass the same at its upper end through a tube, K, fixed rigidly in position and formed, if desired, integral with the plate I.

In order to hold the mass of material within the feeder from revolving with the wheel, so that the arms $a'$ may act in a proper manner to effect its delivery, I commonly extend a partition, M, rigidly across the tube or hopper B, as shown.

In practice I propose to provide means by which the tube J may be adjusted vertically and fixed in position at the will of the operator. The device shown in the drawings consists of a hand-lever, N, fixed to a rock-shaft, O, having arms P pivoted to the tube J, as shown. The rock-shaft may be extended the entire width of the machine and employed to operate a series of tubes. In order to secure a better action of the arms $a'$, I prefer to construct their ends in the form of thin blades arranged in a substantially vertical position and extending above the top of the arms, the better to divide and loosen the material.

Having thus described my invention, what I claim is—

1. In a fertilizer-distributer, a horizontally-revolving feed-wheel adapted to deliver the material toward its center, in combination with a central vertically-adjustable delivery-spout, whereby the rate of discharge may be varied without changing the speed of the wheel.

2. In a center delivery-distributer, and in combination with a central delivery-orifice, an annular rotary feed-wheel provided with a series of arms, $a'$, extending inward different distances, substantially as described, whereby they are adapted to act successively in forcing the material toward the center.

3. In a center delivery-distributer, the combination of a revolving wheel, a delivery spout at the center, a feed spout or tube, and a rib or partition to prevent the descending material in said tube from revolving with the wheel.

4. In a center delivery-distributer, the combination of an annular wheel and a central vertical discharge-tube provided with a series of inlet-openings at its different sides, whereby the admission of the material from different directions into the tube is permitted.

5. In combination with the feed-wheel and the central discharge-tube, the rock-shaft, its operating-lever, and a connecting device, substantially as described, whereby the rock-shaft is enabled to effect the vertical adjustment of the tube.

In testimony whereof I hereunto set my hand, this 8th day of March, 1887, in the presence of two attesting witnesses.

EDSON JAY CORSER.

Witnesses:
 GEORGE WILSON KIRKPATRICK,
 WASHINGTON LAFAYETTE ACKER.